Nov. 27, 1945.     J. P. EDER     2,389,615

ANEMOMETER

Filed Oct. 9, 1943

INVENTOR
James P. Eder
BY
W. J. Kuppian
ATTORNEY

Patented Nov. 27, 1945

2,389,615

UNITED STATES PATENT OFFICE 2,389,615

ANEMOMETER

James P. Eder, New York, N. Y.

Application October 9, 1943, Serial No. 505,628

6 Claims. (Cl. 73—204)

The present invention relates to fluid flow meters and, more particularly, to hot-wire anemometers.

Instruments of the present type often are used for the measurement of the velocity of gases or other fluids. It is customary to expose an electrically heated resistor element to a stream of fluid, and to determine the fluid velocity as a function of the change in resistance of the resistor, occasioned by the cooling of the resistor resulting from heat loss to the moving stream. In the ordinary case, the heated element forms one leg of a Wheatstone bridge circuit, and the element is exposed to the moving fluid. The bridge indicates an unbalance whenever the resistance of the element is changed by the cooling action of the fluid.

Among the outstanding shortcomings of known apparatus of the foregoing type may be mentioned the difficulty in calibrating the instrument with interchangeable scales. Thus the scale for the temperature-indicating meter generally must be hand calibrated to match each heated element, so that the entire instrument must be provided with a new scale if a new heated element is installed. This disadvantage has been overcome by the present invention.

If attempts are made to calibrate such known instruments at the low-scale and full-scale positions, they show a tendency to be inaccurate at the mid-scale position. This disadvantage, likewise, has been overcome in the present invention.

Additionally, it has been difficult to obtain any appreciable degree of precision with a single meter scale covering a relatively wide range of fluid velocities. In the present invention use is made of a relatively large number of calibration points through a large range of velocities, with means for accurately adjusting the pointer position for each calibration.

The principal objects of the present invention are: to provide an improved fluid-flow meter; to provide means for utilizing uniform interchangeable scales in the indicating meter with means for accurately calibrating the pointer at a number of positions in accordance with predetermined standards; to provide means for and methods of compensating for changes in the specific heat with temperature variations of the metered fluid; to provide a meter having a plurality of scales and means for calibrating the meter at three or more positions on each scale; to provide improved means for establishing the normal operating current for the device; and to provide an improved heated element for the instrument.

These and other objects will become apparent from the following description and from the accompanying drawing.

Generally speaking, the invention comprehends modifying a conventional bridge circuit by including control devices to assist in calibrating the balance-indicating instrument at several positions over the entire scale. Use preferably is made of several separate scales to cover more adequately a wide range of fluid velocities, with provision for a number of calibrations on each of the scales.

Figure 2:
Fig. 2 is an exploded elevational view of the heated element and of the probe to which the element is attached in normal operation.

A Wheatstone bridge 11 utilizes two fixed resistors 12 and 13, having low temperature coefficient of resistance and relatively large heat-dissipating surfaces as compared with the heated element 14 which forms one of the two remaining legs of the bridge 11. With a bridge energizing potential of the order of several volts, the resistances of each leg may be of the order of several ohms, though the values may be increased with higher operating potentials. The element 14 is composed of a winding of relatively fine oxidation-resistant wire, such that the element always will be heated to the same temperature by the circulating current in the bridge under identical operating conditions. One device that has been employed successfully comprises the filament of a small flashlight bulb with the glass envelope removed. As shown in Fig. 2, the filament projects in the normal manner from a bulb base 15, and may be protected appreciably by a yoke-shaped shield 16 soldered or otherwise secured to the base 15. The element 14 conveniently may be connected into the bridge circuit by means of a socket 17 having connecting wires 18 extending therefrom through a suitable handle member or probe 19.

The fourth leg of the bridge comprises a resistor 21 of wire wound on the probe 19, and having a thermal coefficient of resistance similar to that of element 14, thereby to compensate for ambient temperature error, especially where the wire is coarse enough not to heat up appreciably. It has been found, however, that if the resistor 21 is made of fine-enough wire to provide a heating effect, and of a material having a thermal coefficient of resistance slightly different from that of the element 14, additional correction may be made for temperature changes in the specific heat of the metered fluid that otherwise result in exaggerated temperature changes in the element 14 for a given fluid flow rate. The desired coefficient of resistance may be arrived at accurately by proportioning the amounts of two dissimilar metals making up the resistor. Good results have been obtained with a combination of tungsten and Advance wire, in proportions providing compensated meter readings at all temperatures. Resistors 14 and 21 are of different heat capacity, so that they are heated to different temperatures when conducting the same current.

Figure 3:
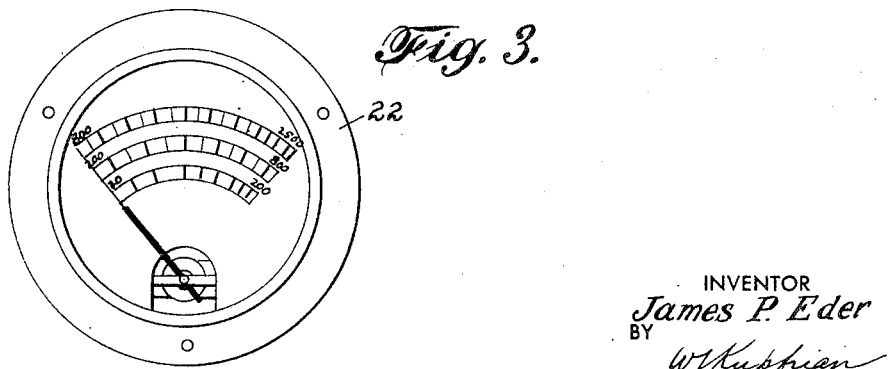
Fig. 3 is a plan view of a typical meter showing the several velocity-indicating scales.

A meter 22 such as a D'Arsonval galvanometer having a full-scale deflection with current of the order of several milliamperes is connected diagonally across the intermediate terminals of the bridge in the conventional manner so as to indicate whether the bridge is balanced or unbalanced. A meter protector or voltage limiter such as variable resistor 23 may be inserted in series with the meter as a protective measure, the resistance being canceled out by turning the control knob when the operator satisfied that excessive currents are not flowing through the meter. The meter preferably is provided with a plurality of scales indicating an equal number of separate velocity ranges. Each successive range preferably meets or overlaps the previous range so that continuous readings may be taken through the entire range merely by making the necessary scale connections. Thus, the first scale may cover velocities of air or other fluid media of from 20 to 200 feet per minute, while the succeeding scales extend the range from 200 to 800, and from 800 to 2,500 feet per minute, respectively, as shown in Fig. 3. Higher and lower readings are possible with change of circuit constants.

Since each of the scales starts with a velocity above zero, properly calibrating the meter for the zero position provides a calibration in the useful operating range, this position being the balanced bridge position at which no current flows through meter 22. The resistor 23, and accordingly, the meter 22 is connected with one of three independent branches through a selector switch 24. The branches comprise variable resistors 25, 26 and 27 corresponding to the low, medium and high scale ranges of the meter 22. The opposite end of each of the resistors connects with an adjustable slider of a balancing resistor 28. The position of the sliders, when once set during the initial calibration of the instrument, determines the bridge ratios, since the slider position determines the proportion of the parts of resistor 28 which add onto resistance 13 and 21, respectively, thereby controlling the bridge resistor ratios.

Figure 1:
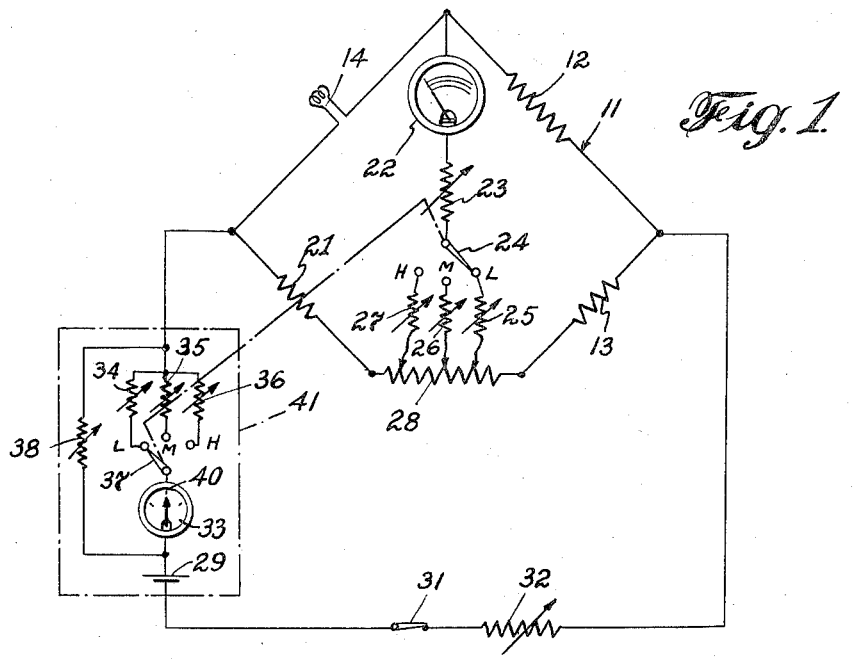
Fig. 1 is a diagram of a modified Wheatstone bridge and of an energizing and control circuit therefor.

The position of the sliders along the resistor 28 controls the meter no-current or null position for each range, and operates in the following simple manner. Assuming the bridge to be energized by a suitable potential, as will be described, the element 14 is placed in a stream of fluid adjusted to flow at the lowest rate shown on the scale, e. g., 20 feet per minute in the case of the illustrated low scale reading. With the switch 24 connected as shown in Fig. 1, the position of the slider from resistor 25 is varied along resistor 28 until the meter pointer shows zero deflection, at which time the bridge is balanced and no current flows through the meter. The process is repeated by exposing the element 14 to the fluid moving at velocities corresponding to the other minimum scale readings, e. g., 200 and 800 feet per minute, respectively, while the switch is connected successively to the resistors 26 and 27, and a like adjustment is made with the corresponding sliders until the pointer again shows zero deflection.

To calibrate the meter for the full scale positions, the element 14 is exposed to the fluid known to be flowing at the rate indicated by the maximum scale readings, and the sensitivity of the meter adjusted for the proper full scale reading in each case by adjusting the amount of the effective resistance of the resistors 25, 26 and 27, respectively. The adjustments required for the full scale readings have no effect upon the previously established zero position adjustments. As shown in Fig. 1, the source of the applied voltage may comprise a dry-cell or a battery of dry cells 29, the flow of current from which is controlled by an off-on switch 31, and by an operator's controlling resistor 32.

With only the maximum and zero positions of the instrument calibrated in terms of an interchangeable scale and standard fluid flow rates, appreciable error may occur in the meter reading at the mid-scale and adjoining positions. The error may be reduced to negligible proportions by providing a third calibration for the middle position of each scale. This may be attained simply by standardizing the applied bridge voltage according to the proper mid-scale reading as by adjusting resistor 32 to vary the voltage drop therethrough until the applied potential produces the proper reading for each scale while the element is exposed to the velocity of fluid indicated at the respective mid-scale positions. These adjustments of resistor 32 may provide a slightly different applied bridge potential than those used when calibrating the zero and full scale positions, and the changed heating effect on the resistors may unbalance the bridge for these positions. The slight error thus introduced is easily overcome by slightly readjusting both the sliders on resistor 28 and the resistors 25, 26, 27. Simple compensating adjustments of the three controlling elements are thus made until all necessary conditions are satisfied.

Although the respective proper positions of the resistor 28, when once determined, may be indicated by suitable indication on the instrument panel of the proper control knob position, such an arrangement does not allow for variations in the voltage source. A better arrangement is to provide a meter in the circuit external of the bridge to denote the prescribed current or voltage conditions. Even this provision, however, would require three separate index marks on the face of such a meter to indicate the respective normal pointer positions.

As shown in Fig. 1, an applied-voltage measuring device 41 requiring only a single index for all three scales provides a further improvement. The device 41 comprises a meter 33 having a single index 40 on the meter face, preferably at the mid-scale position. The meter 33 connects with the bridge through one of a series of adjustable resistors 34, 35 and 36 corresponding to the three scales, any one of which is chosen by a selector switch 37, preferably ganged with the switch 24. A shunt resistor 38 extends across the meter 33 and if desired across the three resistors as well. The purpose of the device 41 is to permit obtaining a single meter reading for each of the three required positions of resistor 32. Thus, to provide the true mid-scale reading of meter 22, both resistors 32 and 34 may be adjusted to vary the proportion of current bypassed through 38 and so as to bring the meter pointer into alignment with the index 40, while at the same time keeping the true mid-scale reading on meter 22. The same procedure is followed for the other two scales by adjusting the resistors 35 and 36 in like manner, until both meters 22 and 33 indicate mid-scale positions.

The entire foregoing calibration operation has been performed in practice in a matter of fifteen minutes or less and when once complete maintains its constancy over a long useful life. No hand-calibrated scales are required. In using the apparatus, the element 14 is exposed to the fluid to be measured, switch 31 closed, the desired scale selected, and resistor 32 regulated until the pointer of meter 33 aligns with index 40 showing a reestablishment of the conditions arrived at during the calibrating operation. The resistor 23 is shorted out, and the velocity read directly from the meter 22.

It is obvious that although the principles of the present invention have been described as applied to a velocity-indicating meter operating unidirectionally from the zero position, that the same principles may be adapted to use with a center-type indicating meter wherein the pointer swings in both directions. Likewise, any other type of indicating or recording instrument may be located at the position of meter 22.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

I claim:

1. A fluid flow meter comprising a bridge circuit having four legs including a resistance heated by current flowing through said circuit and adapted to be interposed in a stream of fluid to be measured, a meter having a scale thereon denoting progressively increasing degrees of unbalance across said circuit, a bridge voltage source, and adjustment means for calibrating said meter at substantially the zero, mid-scale, and full scale positions under known operating conditions, said adjustment means comprising a bridge ratio adjuster for said zero position calibration, a bridge voltage adjuster for said mid-scale calibration, and a meter-sensitivity adjuster for said full scale calibration.

2. A hot-wire anemometer comprising a bridge circuit including electrically heated resistor elements, and having a meter adapted to indicate an unbalanced bridge relation as a function of the variation in resistance of one of said elements in response to the cooling effect of the metered fluid thereover, a scale on said meter denoting a range of velocities of said fluid extending from a minimum velocity at the zero scale position to a maximum velocity at the full scale position, a bridge voltage source, and adjustment means for calibrating said meter at substantially the zero, mid-scale, and full scale positions under known operating conditions, said adjustment means comprising a bridge ratio adjuster for said zero position calibration, a bridge voltage adjuster for said mid-scale calibration, and a meter-sensitivity adjuster for said full scale calibration.

3. A hot-wire anemometer comprising a bridge circuit including electrically heated resistor elements, and having a meter adapted to indicate an unbalanced bridge relation as a function of the variation in resistance of one of said elements in response to the cooling effect of the metered fluid thereover, a scale on said meter denoting a range of velocities of said fluid extending from a minimum velocity at the zero scale position to a maximum velocity at the full scale position, a bridge voltage source, and adjustment means for calibrating said meter at substantially the zero, mid-scale, and full scale positions under known operating conditions, said adjustment means comprising a bridge ratio adjuster for said zero position calibration, a bridge voltage adjuster for said mid-scale calibration, and a meter-sensitivity adjuster for said full scale calibration, said anemometer including an electrical meter responsive to said voltage adjuster for indicating a predetermined applied bridge voltage.

4. An anemometer as claimed in claim 3, wherein said second mentioned meter is provided with an index and a pointer, and including means for adjusting said pointer to said index independently of said bridge voltage.

5. A hot-wire anemometer comprising a bridge circuit including electrically heated resistor elements, and having a meter adapted to indicate an unbalanced bridge relation as a function of the variation in resistance of one of said elements in response to the cooling effect of the metered fluid thereover, a plurality of scales on said meter denoting from the respective zero to full scale positions portions of an extended range of velocities of metered fluid, a bridge voltage source, adjustment means for calibrating said meter at substantially the zero, mid-scale, and full scale positions under known operating conditions, said adjustment means comprising a bridge ratio adjuster for each of said zero position calibrations, a bridge voltage adjuster for determining the voltage for each of said mid-scale calibrations, a meter-sensitivity adjuster for each of said full scale calibrations, and a selector for rendering a group of said adjusters operable at a time.

6. A hot-wire anemometer comprising a bridge circuit including electrically heated resistor elements, and having a meter adapted to indicate an unbalanced bridge relation as a function of the variation in resistance of one of said elements in response to the cooling effect of the metered fluid thereover, a plurality of scales on said meter denoting from the respective zero to full scale positions portions of an extended range of velocities of metered fluid, a bridge voltage source, adjustment means for calibrating said meter at substantially the zero, mid-scale, and full scale positions under known operating conditions, said adjustment means comprising a bridge ratio adjuster for each of said zero position calibrations, a bridge voltage adjuster for determining the voltage for each of said mid-scale calibrations, a meter-sensitivity adjuster for each of said full scale calibrations, and a selector for rendering a group of said adjusters operable at a time, said anemometer including an electrical meter responsive to said adjusted bridge voltage, said last-mentioned meter having an index and a pointer, and means for correlating said index and pointer for each of said scales at a predetermined position of said bridge voltage adjuster.

JAMES P. EDER.